July 12, 1932.　　　S. MITSKOFF　　　1,866,900

GAMBREL

Filed April 11, 1931

Inventor
Samuel Mitskoff
By M. Talbert Dick
Attorney

Patented July 12, 1932

1,866,900

UNITED STATES PATENT OFFICE

SAMUEL MITSKOFF, OF DES MOINES, IOWA

GAMBREL

Application filed April 11, 1931. Serial No. 529,509.

The principal object of my invention is to provide a gambrel that will successfully support a carcass in a proper position regardless of the weight of the carcass.

A further object of this invention is to provide a gambrel that will not mutilate the carcass being supported.

A still further object of my invention is to provide a gambrel that will quickly release and quickly engage a carcass.

A still further object of my invention is to provide a gambrel that is economical in manufacture and durable in use.

These and other objects will be apparent to those skilled in the art.

My invention consists in construction, arrangement and combination of the various parts of the device, whereby the objects contemplated are attained as hereinafter more fully set forth, pointed out in my claims and illustrated in the accompanying drawing, in which:

In large slaughtering houses, time is a factor to be considered, and the purpose of my invention is to facilitate the hanging up of animals by the hind legs during the butchering procedure.

Figure 1:
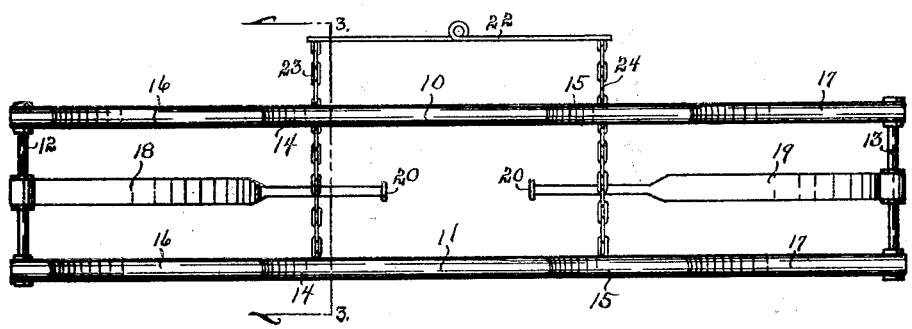
Fig. 1 is a front view of my complete invention ready for use.
Figure 2:
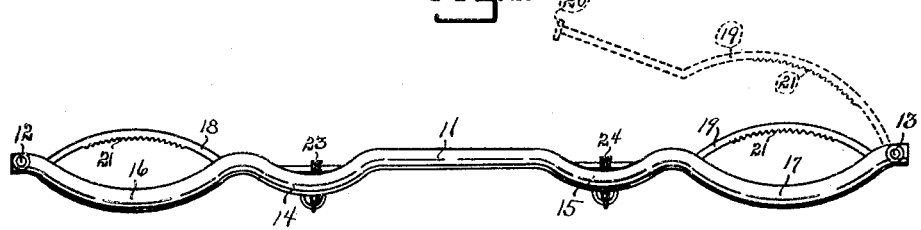
Fig. 2 is a bottom view of the device in a closed condition.
Figure 3:
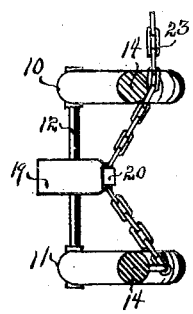
Fig. 3 is a cross sectional view of the gambrel taken on line 3—3 of Fig. 1, and more fully illustrates its construction.
Figure 4:
Fig. 4 is a top plan view of a section of one of the hinged limb engaging arms.

The base portion of my invention consists of two bars 10 and 11, spaced apart and rigidly held together at their two ends by the two spacing rods 12 and 13, respectively, as shown in Fig. 1. These bars, when in normal positions extend horizontally and the bar 10 is approximately directly above the bar 11. It should also be noted that these bars are exact duplicates of each other. Each of these bars are straight at its central portion. At each side of the central straight portion is a short lengthed forwardly curved portion which I have designated by the numerals 14 and 15, respectively. At the outer side of each of the curved portions 14 and 15 is a comparatively large forwardly curved portion designated by the numerals 16 and 17, respectively. These two curved portions 16 and 17 are designed to engage one side of each of the two limbs of the carcass to be supported and are located at the outer ends of each of the two bars 10 and 11. The numerals 18 and 19 designate the two limb engaging arms, hinged at their outer ends to the two space rods 12 and 13, respectively and between the bars 10 and 11 as shown in Fig. 1. Each of these arms is rearwardly curved at its outer end portion as shown in Fig. 2. Their inner or free end portions are straight. The numeral 20 designates an enlarged end formed on the free end of each of the arms 18 and 19. Integrally formed on the inner side of the curved portion of each of the arms 18 and 19 are teeth 21.

The numeral 22 designates a bar designed to be secured to a suitable support such as a track, beam or like. The numeral 23 designates a chain having its lower end secured by suitable means to the bar 11 at its curved portion 14 and its upper end secured to one end of the bar 22. The numeral 24 designates a second chain, but having its upper end secured to the other end of the bar 22 and its lower end secured by suitable means to the bar 11 at its curved portion 15 as shown in Fig. 1. These chains extend upwardly from the bar 11 on the rear sides of the free end portions of the arms 18 and 19, respectively, and then pass upwardly on the forward side of the bar 10 to the bar 22, as shown in Fig. 1.

To support a carcass by my gambrel it is merely necessary to place one limb of the animal between the embracing arm 18 and the curved portions 16 and the other limb of the animal between the embracing arm 19 and the curved portions 17. The weight of the device and the carcass will tend to pull each of the chains 23 and 24 to a straight vertical line and in doing this will move the embracing arms 18 and 19 forwardly and toward the same vertical plane as the bars 10 and 11, thereby rigidly securing the carcass to the gambrel. It will be noted that the greater the weight of the animal being supported, the more securely will the legs of the animal be attached to my gambrel. To remove the carcass from my invention it is merely necessary to lift upwardly on the carcass until the weight of the carcass does not effect the device at which time the arms 18 and 19 will not effectively be engaging the limbs of the animal and the limbs or ankles of the animal may be moved downwardly from between the arms 18 and 19 and the bars 10 and 11.

This is made possible by the chains 23 and 24 being in such loosened condition as to permit the rearward swinging of the arms 18 and 19. If it is desired, the chains 23 and 24 may be completely detached from engagement with the free ends of the arms 18 and 19, as shown by dotted lines in Fig. 2, and the arms 18 and 19 may be swung completely to the rear. However, this is usually not necessary in attaching or detaching a carcass to the device unless the legs of the animal are exceptionally great in diameter. The enlarged heads 20 on the extreme free ends of the arms 18 and 19 prevent the chains 23 and 24 from accidentally slipping from the free end portions of the arms 18 and 19 when the arms 18 and 19 are moved to the rear to receive or to expel the legs of a carcass. The free end portions of the arms 18 and 19 may be used as handles to manually move the arms to the rear for the receiving or expelling of the limbs of the animal to be supported.

From the foregoing description of my invention it will readily be appreciated that an animal may be easily and quickly attached or detached from my invention and may be successfully supported for butchering purposes without mutilating or damaging the limbs of the animal that is secured to my gambrel.

Some changes may be made in the construction and arrangement of my improved gambrel without departing from the real spirit and purpose of my invention, and it is my intention to cover by my claims any modified forms of structure or use of mechanical equivalents which may be reasonably included within their scope.

I claim:

1. In a device of the class described, two spaced apart bars, connecting members between said bars, an arm pivoted to each of said connecting members, and a plurality of elongated flexible supporting members secured to one of said bars and engaging said arms, respectively.

2. In a device of the class described, two spaced apart bar members, two connecting members secured to the end portions of said bars, respectively, a curved arm rotatably mounted on each of said connecting members, a supporting chain secured to one of said bars and extending along the rear side of one of said arms and the forward side of the other bar, and a second supporting chain secured to the same bar that the first mentioned chain is secured to extending on the rear side of the other arm and the forward side of the other bar.

3. In a device of the class described, a bar, a second bar spaced apart and above said first mentioned bar, connecting rods between said bars, a curved arm rotatably mounted on each of said connecting rods, and two supporting chains secured to said first mentioned bar; said chains first passing on the rear side of said two arms, respectively and then passing on the forward side of said second mentioned bar.

4. In a device of the class described, a bar, a second bar spaced apart and above said first mentioned bar, connecting rods between said bars, a curved arm rotatably mounted on each of said connecting rods, teeth formed on the inner side of said two curved arms, and two supporting chains secured to said first mentioned bar; said chains first passing on the rear side of said two arms, respectively and then passing on the forward side of said second mentioned bar.

5. In a device of the class described, a bar member, a second bar member, a curved portion near the two outer ends of both of said bar members, two connecting members for rigidly securing the ends of said two bar members together, an arm rotatably mounted on each of said connecting members, a curved portion formed in each of said arms adjacent their rotatably mounted end, and two flexible members secured to said first mentioned bar; said flexible members extending first along the rear sides of said two arms, respectively and then extending along and past the forward side of the second mentioned bar member.

6. In a device of the class described, a bar member, a second bar member, a forwardly curved portion near the two outer ends of both of said bar members, two connecting members for rigidly securing the ends of said two bar members together, an arm rotatably mounted on each of said connecting members, a rearwardly curved portion formed in each of said arms adjacent their rotatably mounted end, and two flexible members secured to said first mentioned bar; said flexible members extending first along the rear sides of said two arms, respectively and then extending along and past the forward side of the second mentioned bar member.

7. In a device of the class described, a bar member, a second bar member, a curved portion near the two outer ends of both of said bar members, two connecting members for rigidly securing the ends of said two bar members together, an arm rotatably mounted on each of said connecting members, a curved portion formed in each of said arms adjacent their rotatably mounted end, an enlarged head formed on the free end of each of said arms, and two flexible members secured to said first mentioned bar; said flexible members extending first along the rear sides of said two arms, respectively and then extending along and past the forward side of the second mentioned bar member.

8. In a device of the class described, a bar member, a second bar member; said bar members each having a straight portion near their centers, a comparatively small curved portion on each side of said straight portion, a comparatively large curved portion near each of their outer ends, two connecting rods for rigidly securing the ends of each of said bar members to each other, an arm rotatably mounted on each of said connecting rods, two chains connected at their lower ends to said first mentioned bar member at its two comparatively small curved portions, and a cross bar secured to the upper ends of said chains; said chains engaging and passing on the rear sides of said arms and then passing and engaging the forward side of said second mentioned bar member.

SAMUEL MITSKOFF.